(12) United States Patent
Lin

(10) Patent No.: US 11,346,473 B2
(45) Date of Patent: May 31, 2022

(54) SLEEVE

(71) Applicant: Chien-Ting Lin, Santa Fe Springs, CA (US)

(72) Inventor: Chien-Ting Lin, Santa Fe Springs, CA (US)

(*) Notice: Subject to any disclaimer, the term of this patent is extended or adjusted under 35 U.S.C. 154(b) by 497 days.

(21) Appl. No.: 16/558,362

(22) Filed: Sep. 3, 2019

(65) Prior Publication Data

US 2020/0072398 A1  Mar. 5, 2020

(30) Foreign Application Priority Data

Sep. 4, 2018 (CN) .......................... 201821441784.1

(51) Int. Cl.
*F16L 21/06* (2006.01)
*F16B 2/06* (2006.01)
*F16L 33/10* (2006.01)

(52) U.S. Cl.
CPC ............ *F16L 21/065* (2013.01); *F16B 2/065* (2013.01); *F16L 33/10* (2013.01)

(58) Field of Classification Search
CPC .................................. B62L 19/36; F16B 2/065
See application file for complete search history.

(56) References Cited

U.S. PATENT DOCUMENTS

| | | | | |
|---|---|---|---|---|
| 5,566,460 A * | 10/1996 | Bates | ...................... | G01C 15/06 33/296 |
| 6,142,699 A * | 11/2000 | Pao | ...................... | F16B 7/1454 403/109.5 |
| 6,557,878 B2 * | 5/2003 | Chen | ...................... | B62K 19/36 280/226.1 |
| 8,646,733 B2 * | 2/2014 | Radzinsky | ................ | A61F 2/76 248/74.1 |
| 8,832,910 B2 * | 9/2014 | Lah | ...................... | A63C 11/221 24/19 |
| 9,120,217 B2 * | 9/2015 | Fischer, Jr | ................ | B25G 1/04 |
| 9,631,656 B2 * | 4/2017 | Sato | ...................... | F16B 7/1418 |
| 9,981,707 B1 * | 5/2018 | Chen | ...................... | B62H 5/001 |
| 10,051,930 B2 * | 8/2018 | Heim | ...................... | A45B 9/00 |
| 10,807,673 B2 * | 10/2020 | Choi | ...................... | B62K 19/36 |
| 11,035,558 B2 * | 6/2021 | Lenz, Jr. | ................ | F21V 21/22 |

(Continued)

*Primary Examiner* — Daniel J Wiley
(74) *Attorney, Agent, or Firm* — Lin & Associates Intellectual Property, Inc.

(57) ABSTRACT

The present invention discloses a sleeve for sleeving on an object, which includes: a first body portion, a second body portion, and a first groove. The first body portion has a first reception portion, and the first reception portion has a first notch, and the first notch is provided with a first fastening member. The second body portion is coupled to the first body portion. One end of the first groove is disposed at an adjacent position between the first notch and the second body portion, and the other end of the first groove extends to an appropriate position along an outer edge of a connection between the first body portion and the second body portion. The first groove is separated from the first reception portion by a first thin wall. One end of the object penetrates through the first reception portion, and the first notch is pressed by the first fastening member so that the first groove is broken along the first thin wall to form a first broken opening. The first notch is pressed and tightened by the first fastening member so that the first body portion and the object are fixed to each other.

6 Claims, 10 Drawing Sheets

(56) References Cited

U.S. PATENT DOCUMENTS

2008/0145140 A1\* 6/2008 Chen ................. B62K 19/36
403/24
2008/0298886 A1\* 12/2008 Chen ................. B62K 19/36
280/288.4

\* cited by examiner

SLEEVE

CROSS-REFERENCE TO RELATED APPLICATION

This application claims the priority of Chinese patent application No. 201821441784.1, filed on Sep. 4, 2018, which is incorporated herewith by reference.

BACKGROUND OF THE INVENTION

1. Field of the Invention

The present invention relates to a sleeve, in particular to a sleeve having a broken opening.

2. The Prior Arts

Generally, a sleeve for sleeving on an object has many forms. A common sleeve has two adjacent bodies, and one of which has a reception portion, and the reception portion has a notch, and the notch is provided with a fastening member. The object is placed in the reception portion, and the notch is pressed and tightened by the fastening member to narrow the notch, so that the sleeve and the object are fixed to each other.

In order to the sleeve and the object to be fixed to each other by using the present sleeve, it is necessary to provide a large groove between the two main bodies, and the large groove is broken from the notch along the intersection of the two main bodies, and it terminates at an appropriate position. The present sleeve is respectively provided with a large groove on both sides of the notch, and the two main body portions are respectively separated, and the purpose is that when the notch is pressed and tightened by the fastening member, the notch can be reduced to an appropriate size without being restricted by the other main body so that the object and the sleeve are fixed to each other. In addition, the large grooves installation can increase the life and productivity of the sleeve mold.

Because the present sleeve is provided with the large groove, the stability between the two main bodies is often deteriorated, that is, when the two main bodies are pulled by an external force, the openings of the large groove become larger or smaller, resulting in instability.

Another present sleeve is not provided with the large groove between the two main bodies, so the stability is better. The disadvantage is that when the notch is pressed and tightened by the fastening member, a variation range of the notch is restricted by the other body, which causes the sleeve and the object that are not fixed to each other. To solve this problem, the sleeve usually needs to have two longer bodies, that is, the length of the sleeve must be lengthened to a certain extent to reduce the mutual limitation of the two main bodies so that the sleeve and the object can be fixed to each other.

SUMMARY OF THE INVENTION

In order to overcome the problem that the present sleeve has poor stability due to large grooves or increase the length of the sleeve due to maintaining stability, to improve the life of the sleeve mold and the production efficiency, the present invention provides a sleeve having a first body portion and a second body portion. A first groove is disposed at a connection between the first body portion and the second body portion, and the first groove is separated from a first reception portion by a first thin wall. A first notch is pressed by the fastening member so that the first groove is broken along the first thin wall to form a first broken opening, and the first body portion is partially separated from the second body portion, and a variation range of a width of the first notch is not restricted by the second body portion so that the first notch is pressed and tightened by the first fastening member. When the width of the first notch becomes narrow, the first body portion and the object are fixed to each other. The sleeve has good stability and does not need to increase the length of the sleeve, which can reduce the storage size.

The technical solution adopted by the present invention to solve the technical problems is that a sleeve for sleeving on an object, comprising: a first body portion having a first reception portion, wherein the first reception portion has a first notch, and the first notch is provided with a first fastening member; a second body portion, coupled to the first body portion; a first groove, wherein one end of the first groove is disposed at an adjacent position between the first notch and the second body portion, and the other end of the first groove extends to an appropriate position along an outer edge of a connection between the first body portion and the second body portion, and the first groove is separated from the first reception portion by a first thin wall; and wherein one end of the object penetrates through the first reception portion, and the first notch is pressed by the first fastening member so that the first groove is broken along the first thin wall to form a first broken opening and the first body portion is partially separated from the second body portion and a variation range of the width of the first notch is not restricted by the second body portion, and the first notch is pressed and tightened by the first fastening member, and the width of the first notch becomes narrow, so that the first body portion and the object are fixed to each other.

Preferably, the object is a spherical body, and the spherical body has a screw extending outwardly from a center thereof.

Preferably, the second body portion has a second reception portion, and the second reception portion is coupled to the first reception portion.

Preferably, the object that is a first tube further includes a second tube and the sleeve further includes a second fastening member, and a diameter of the second tube is larger than a diameter of the first tube so that one end of the second tube is inserted into the second reception portion, and the second fastening member penetrates through a predetermined hole of the second body portion, and the second body portion and the second tube are fixed to each other so that one end of the first tube penetrates through the first reception portion and is inserted into the second tube, and the first tube is slidably disposed in the second tube so that the first notch is pressed and tightened by the first fastening member, and the first body portion and the first tube are fixed to each other.

Preferably, the second reception portion has a second notch, and the second notch is provides with a third fastening member and the object that is the first tube further includes the second tube, and a diameter of the second tube is larger than a diameter of the first tube so that one end of the second tube is inserted into the second reception portion, and the second notch is pressed and tightened by the third fastening member, and the second body portion and the second tube are fixed to each other, so that one end of the first tube penetrates through the first reception portion and is inserted into the second tube, and the first tube is slidably disposed in the second tube, so that the first notch is pressed and tightened by the first fastening member, and the first body portion and the first tube are fixed to each other.

Preferably, the first groove is disposed on a side of the first notch, and the first groove is separated from the first reception portion by the first thin wall, and a second groove is disposed on a position corresponding to the other side of the first notch, and the second groove is separated from the first reception portion by a second thin wall.

The present invention has the beneficial effects that the first notch is pressed by the first fastening member so that the first broken opening is generated by the first thin wall of the first groove, and the first body portion is partially separated from the second body portion by the first broken opening. A variation range of a width of the first notch is not restricted by the second body portion so that the first notch is pressed and tightened by the fastening member and the width of the first notch becomes narrow, and the first body portion and the object are fixed to each other. The present invention can increase the stability, and reduce the length and reduce the storage size.

BRIEF DESCRIPTION OF THE DRAWINGS

The present invention is further described below in conjunction with the accompanying drawings and embodiments.

DETAILED DESCRIPTION OF THE PREFERRED EMBODIMENT

Figure 1:
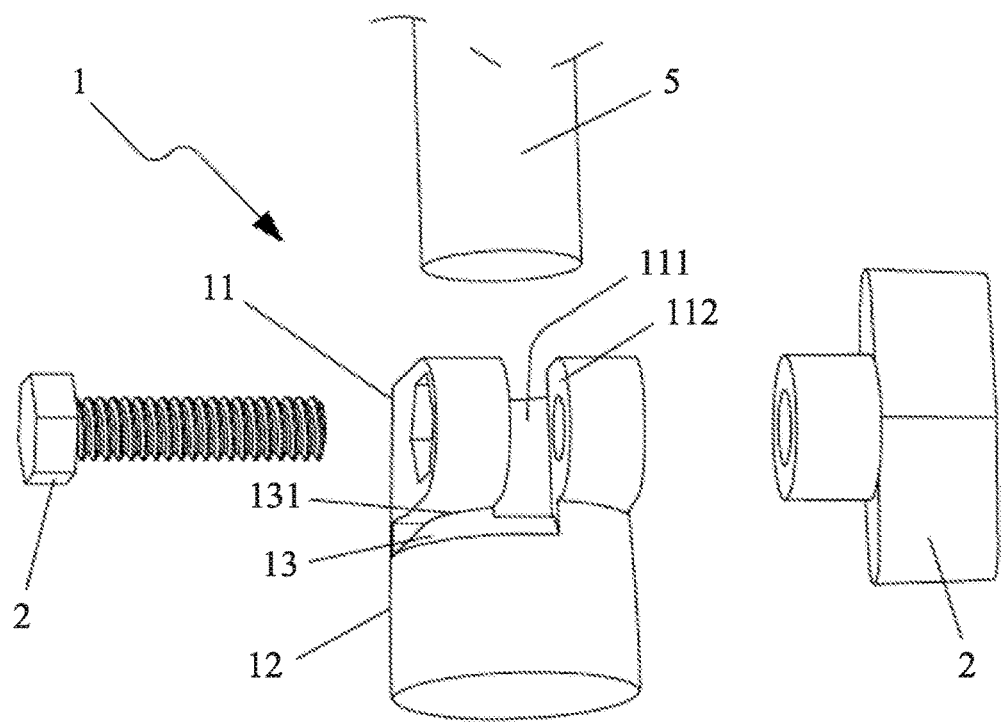
FIG. 1 illustrates an exploded schematic view according to the first embodiment of the present invention.

Hereinafter, the embodiments of the present invention will be described with reference to FIGS. 1 to 8B. This description is not intended to limit the embodiments of the present invention, but is one of the embodiments of the present invention.

As shown in FIG. 1 to FIG. 4B, according to a first embodiment of the present invention, a sleeve 1 is used for sleeving on an object 5, which comprises: a first body portion 11, a second body portion 12 and a first groove 13, and the first body portion 11 has a first reception portion 111. The first reception portion 111 has a first notch 112. The first notch 112 is provided with a first fastening member 2, and the second body portion 12 is coupled to the first body portion 11. One end of the first groove 13 is disposed at an adjacent position between the first notch 112 and the second body portion 12, and the other end of the first groove 13 extends to an appropriate position along an outer edge of a connection between the first body portion 11 and the second body portion 12, and the first groove 13 is separated from the first reception portion 111 by a first thin wall 131, and one end of the object 5 is inserted into the first reception portion 111, and the first notch 112 is pressed by the first fastening member 2 so that the first groove 13 is broken along the first thin wall 131 to form a first broken opening 1311 so that the first body portion 11 is partially separated from the second body portion 12 and a variation range of a width of the first notch 112 is not restricted by the second body portion 12, and the first notch 112 is pressed and tightened by the first fastening member 2, and the width of the first notch 112 becomes narrow so that the first body portion 11 and the object 5 are fixed to each other.

FIG. 1 is an exploded schematic view according to the first embodiment of the present invention. The first groove 13 is disposed at a position at a connection between the first body portion 11 and the second body portion 12 of the present embodiment. One end of the first groove 13 is disposed at an adjacent position between the first notch 112 and the second body portion 12, and the other end of the first groove 13 extends to an appropriate position along an outer edge between the first body portion 11 and the second body portion 12.

Figure 2:
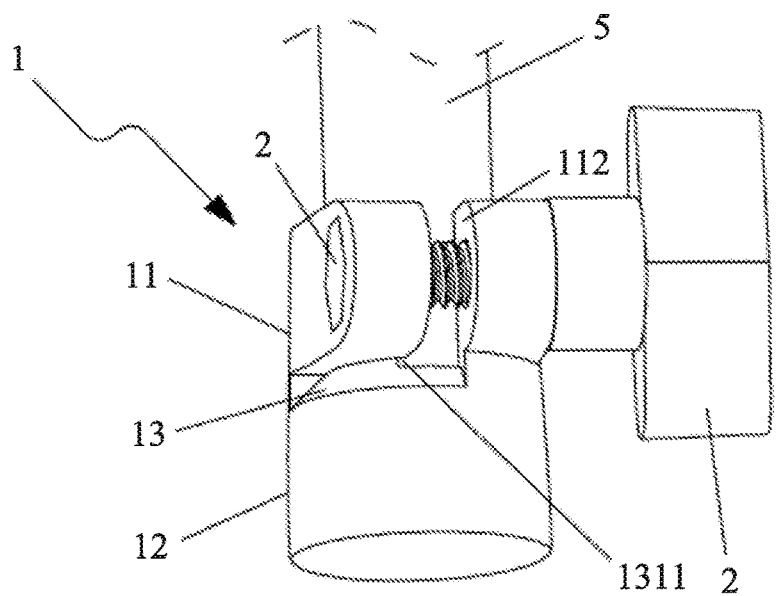
FIG. 2 illustrates a schematic view of the assembly according to the first embodiment of the present invention.

FIG. 2 is a schematic view of the assembly according to the first embodiment of the present invention. One end of the object 5 of the present embodiment penetrates through the first reception portion 111, and the first notch 112 is pressed by the first fastening member 2, so that the first groove 13 is broken along the first thin wall 131 to form a first broken opening 1311, and the first body portion 11 is partially separated from the second body portion 12. The variation range of the width of the first notch 112 is not restricted by the second body portion 12. The first notch 112 is pressed and tightened by the fastening member 2, and the width of the first notch 112 becomes narrow so that the first body portion 11 and the object 5 are fixed to each other.

Figure 3A:
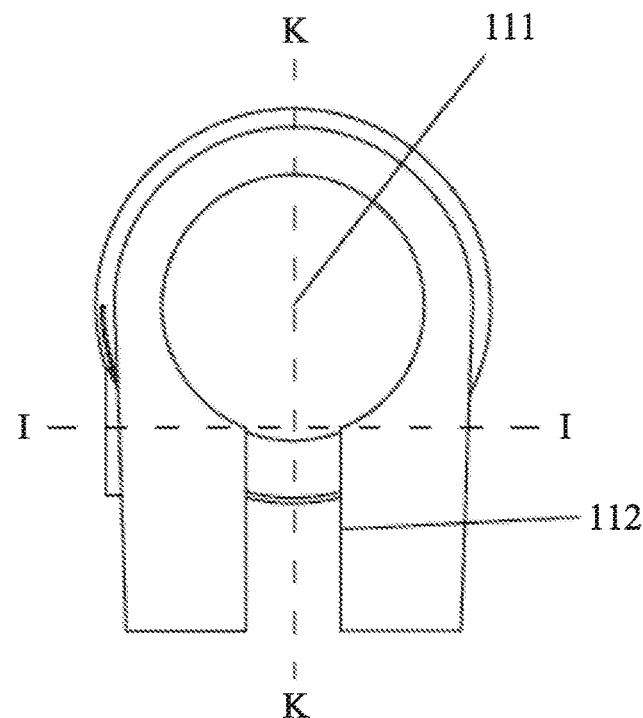
FIG. 3A illustrates a top planar schematic view of before the first notch is pressed by the first fastening member according to the first embodiment of the present invention.
Figure 3B:
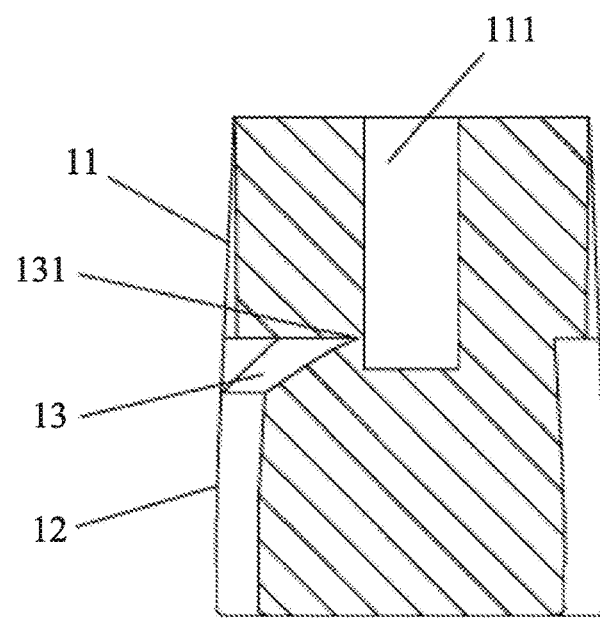
FIG. 3B illustrates a cross-sectional schematic view taken along section line II of before the first notch is pressed by the first fastening member according to the first embodiment of the present invention.
Figure 3C:
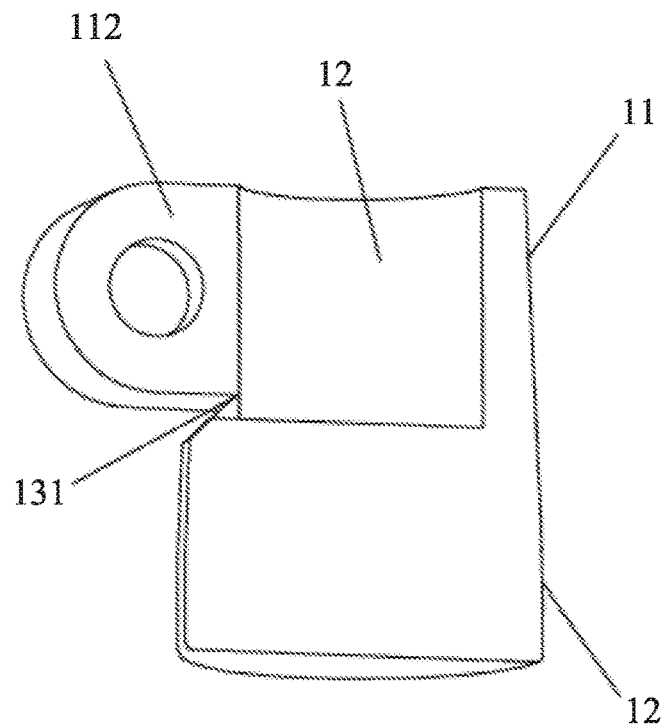
FIG. 3C illustrates a cross-sectional schematic view taken along section line KK of before the first notch is pressed by the first fastening member according to the first embodiment of the present invention.

FIGS. 3A, 3B and 3C are respectively a top planar schematic view, a cross-sectional schematic view taken along section line II, and a cross-sectional schematic view taken along section line KK of before the first notch 112 is pressed by the first fastening member 2 according to the first embodiment of the present invention. The first groove 13 is separated from the first reception portion 111 by a first thin wall 131. The first fastening member 2 of the present embodiment is a screw nut set, and may also be other fixing components.

Figure 4A:
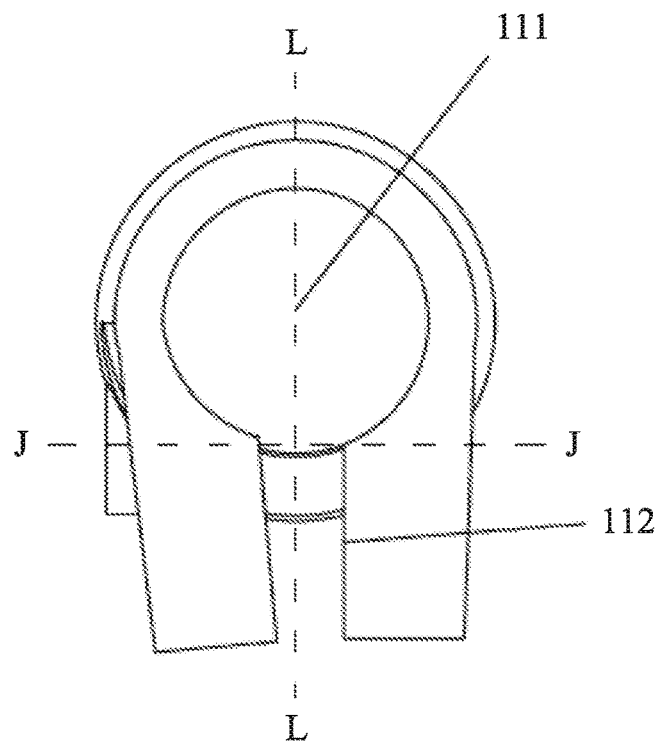
FIG. 4A illustrates a top planar schematic view of after the first notch is pressed by the first fastening member according to the first embodiment of the present invention.
Figure 4B:
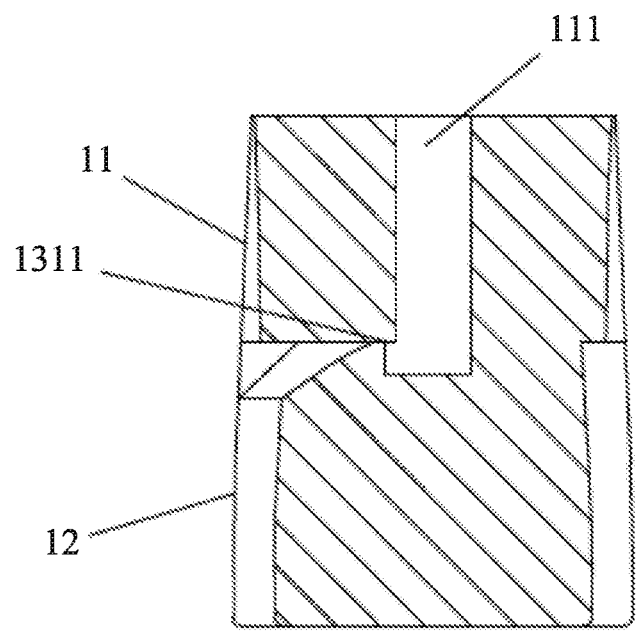
FIG. 4B illustrates a cross-sectional schematic view taken along section line JJ of after the first notch is pressed by the first fastening member according to the first embodiment of the present invention.
Figure 4C:
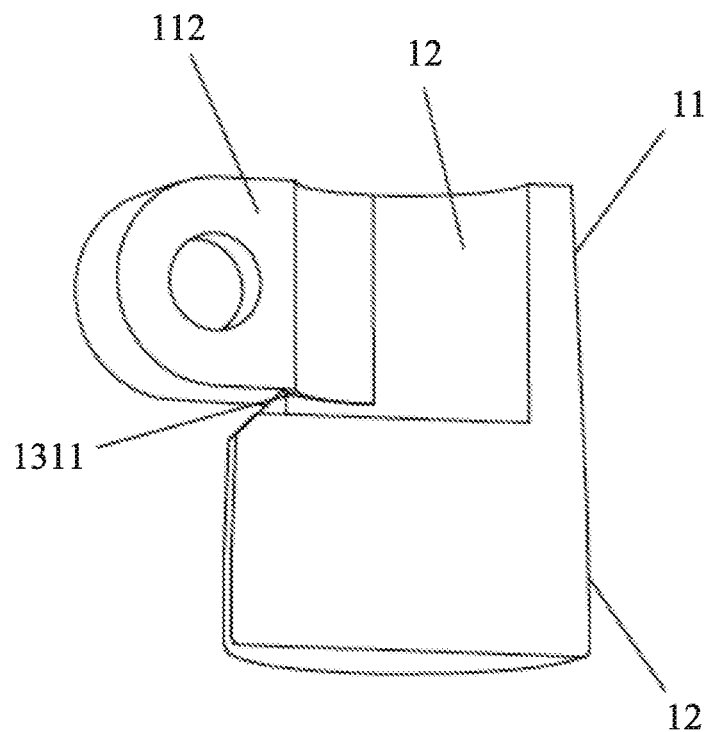
FIG. 4C illustrates a cross-sectional schematic view taken along section line LL of after the first notch is pressed by the first fastening member according to the first embodiment of the present invention.

FIGS. 4A, 4B and 4C are respectively a top planar schematic view, a cross-sectional schematic view taken along section line JJ, and a cross-sectional schematic view taken along section line LL of after the first notch 112 is pressed by the first fastening member 2 according to the first embodiment of the present invention. The first notch 112 is pressed by the first fastening member 2, and the first fastening member 2 is pressed by the first notch 112 so that the first groove 13 is broken along the first thin wall 131 to form the first broken opening 1311.

Figure 5A:
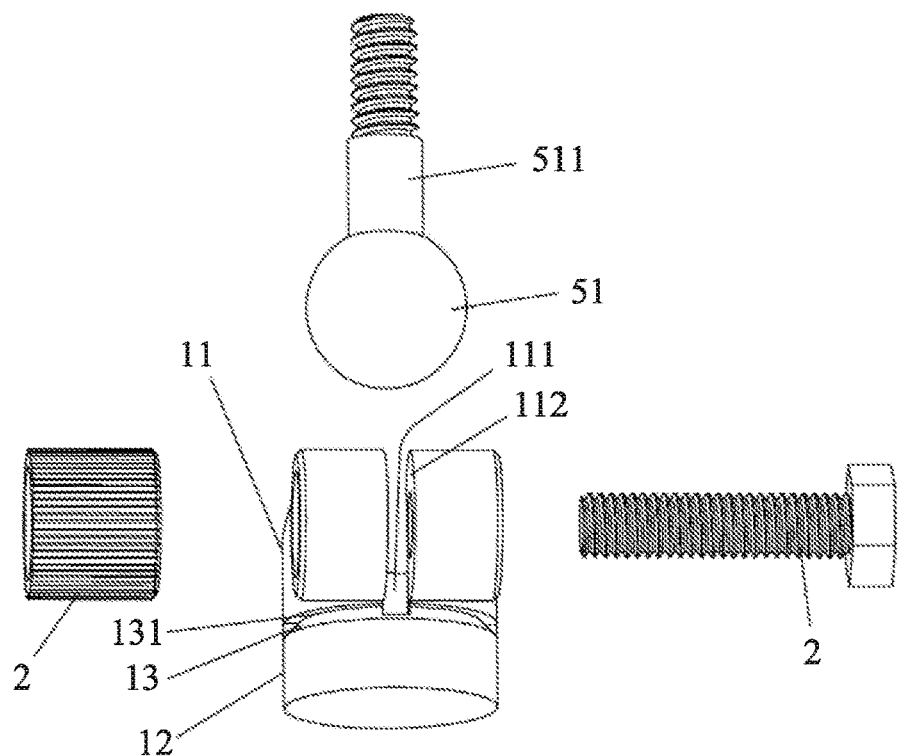
FIG. 5A illustrates an exploded schematic view according to the second embodiment of the present invention.
Figure 5B:
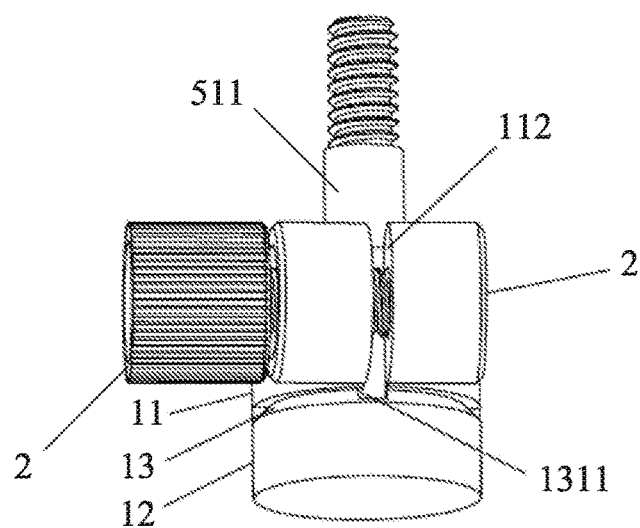
FIG. 5B illustrates a schematic view of the assembly according to the second embodiment of the present invention.
Figure 5C:
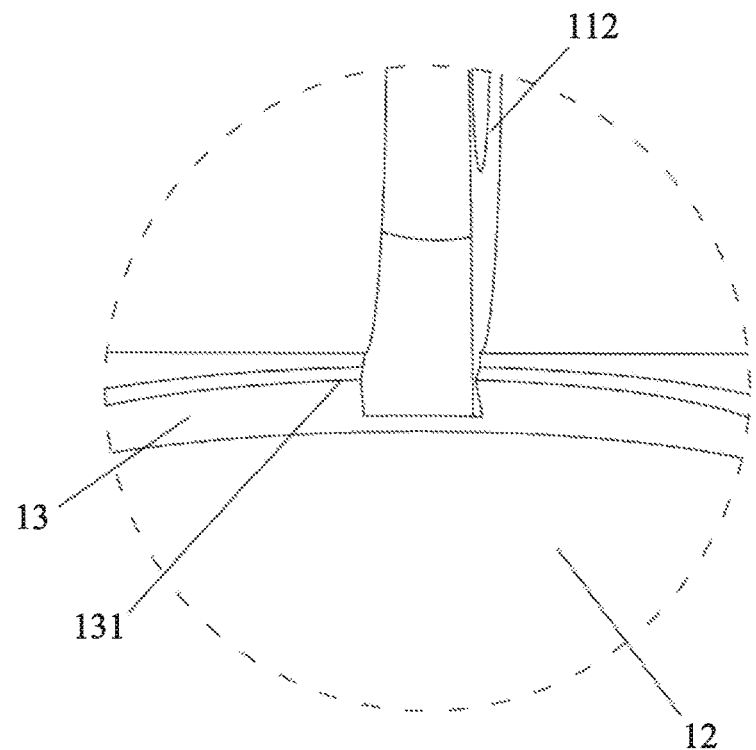
FIG. 5C illustrates an exploded partial enlarged schematic view of before the first groove is broken along the first thin wall according to the second embodiment of the present invention.
Figure 5D:
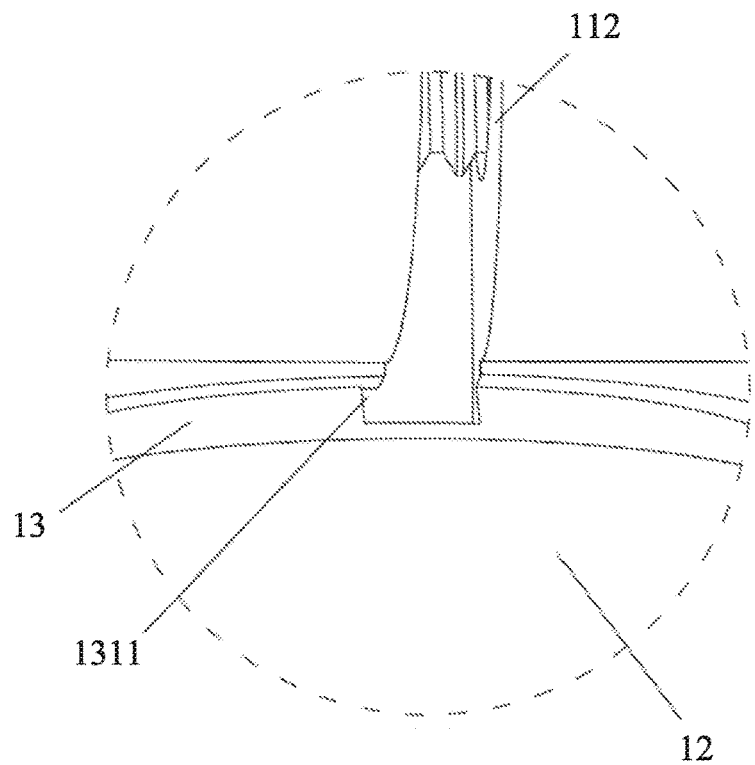
FIG. 5D illustrates a partial enlarged schematic view of the assembly of after the first groove is broken along the first thin wall according to the second embodiment of the present invention.

As show in FIG. 5A to FIG. 5D, wherein FIG. 5A and FIG. 5C are respectively an exploded schematic view and an exploded partial enlarged schematic view of before the first groove 13 is broken along the first thin wall 131 according to a second embodiment of the present invention. FIG. 5B and FIG. 5D are respectively a schematic view of the assembly of the second embodiment of the present invention and a schematic view of the assembly of after the first groove 13 is broken along the first thin wall 131. As shown in FIG. 5A, the object 5 of the present embodiment is a spherical body 51. The spherical body 51 has a screw 511 extending outwardly from a center thereof. The screw 511 can be used to couple to a camera or a mobile phone clip. As shown in FIG. 5C, the first groove 13 is separated from the first reception portion 111 by the first thin wall 131. As shown in FIG. 5B, the spherical body 51 penetrates through the first reception portion 111 and the first notch 112 is pressed by the fastening member 2. As shown in FIG. 5D, the first groove 13 is broken along the first thin wall 131 to form the first broken opening 1311 so that the first body portion 11 is partially separated from the second body portion 12, and the variation range of the width of the first notch 112 is not restricted by the second body portion 12, and the first notch 112 is pressed and tightened by the first fastening member 2, and the width of the first notch 112 becomes narrow to cause the first body portion 11 and the spherical body 51 to be fixed to each other, which causes the first fastening member 2 to be in a released state, and the spherical body 51 to be arbitrarily rotated, the fastening member 2 to be in a pressing state, and the spherical body 51 to be stationary.

Figure 6A:
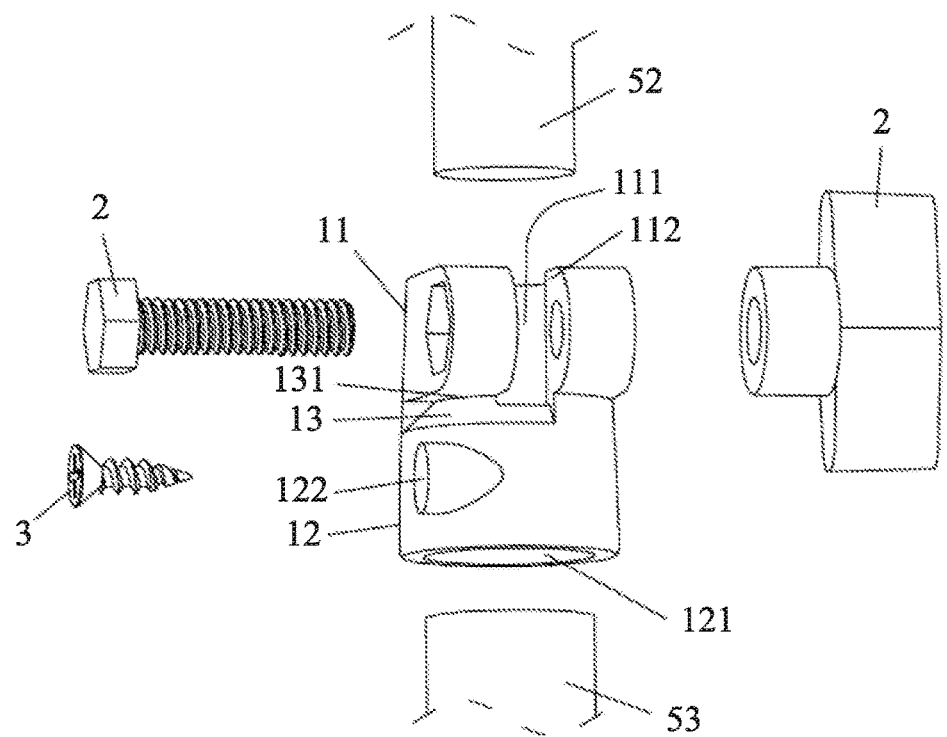
FIG. 6A illustrates an exploded schematic view according to the third embodiment of the present invention.
Figure 6B:
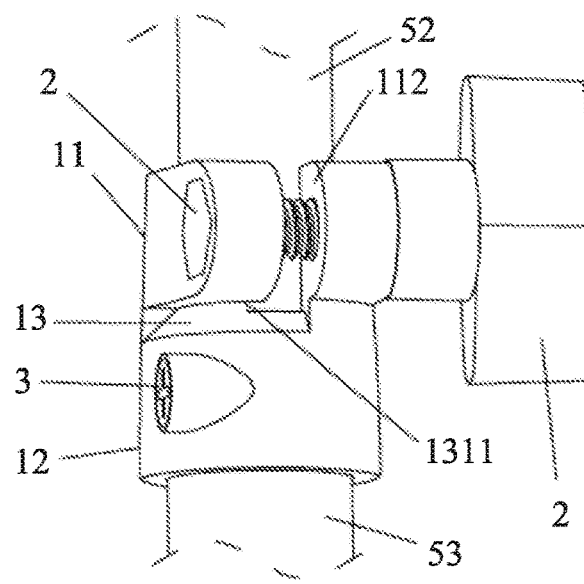
FIG. 6B illustrates a schematic view of the assembly according to the third embodiment of the present invention.

FIGS. 6A and 6B are an exploded schematic view and a schematic view of the assembly according to the third embodiment of the present invention. As shown in FIG. 6A, the second body portion 12 of the present embodiment has a second reception portion 121, and the second reception portion 121 is coupled to the first reception portion 111. The object 5 that is a first tube 52 further includes a second tube 53 and the sleeve 1 further includes a second fastening member 3. A diameter of the second tube 53 is larger than a diameter of the first tube 52. As shown in FIG. 6B, one end of the second tube 53 is inserted into the second reception portion 121. The second fastening member 3 penetrates through a predetermined hole 122 of the second body portion 12 to fix the second body portion 12 and the second tube 53 each other, and one end of the first tube 52 penetrates through the first reception portion 111 and is inserted into the second tube 53. The first tube 52 is slidably disposed in the second tube 53 and the first notch 112 is pressed by the first fastening member 2. The first groove 13 is broken along the first thin wall 131 to form the first broken opening 1311 so that the first body portion 11 is partially separated from the second body portion 12, and the variation range of the width of the first notch 112 is not restricted by the second body portion 12. The first notch 112 is pressed and tightened by the first fastening member 2, and the width of the first notch 112 becomes narrow so that the first body portion 11 and the first tube 52 are fixed to each other. Such the sleeve 1 having the broken opening can reduce the length of the sleeve 1 and ensure the effect of the first body portion 11 and the first tube 52 that are fixed to each other.

Figure 7A:
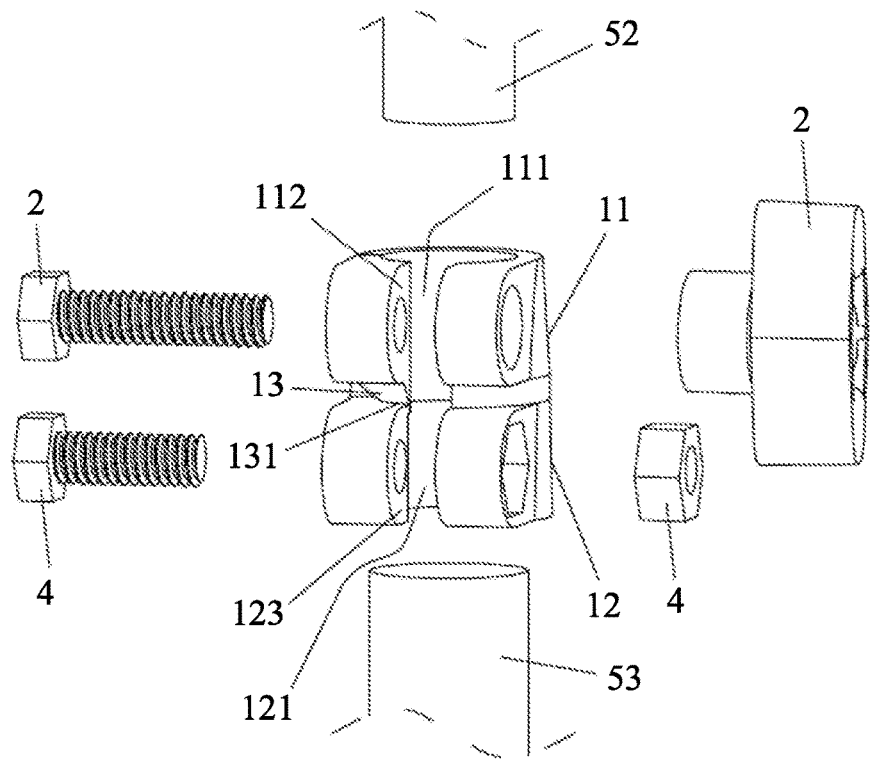
FIG. 7A illustrates an exploded schematic view according to the fourth embodiment of the present invention.
Figure 7B:
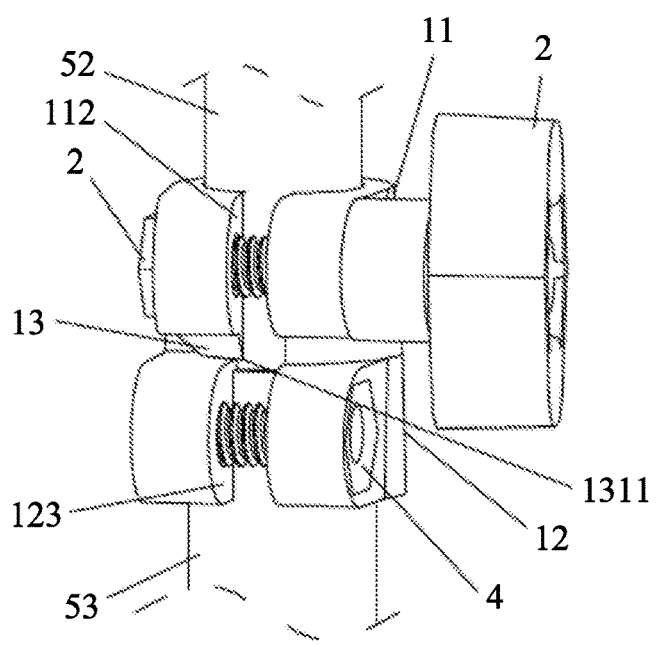
FIG. 7B illustrates a schematic view according to the fourth embodiment of the present invention.
Figure 7C:
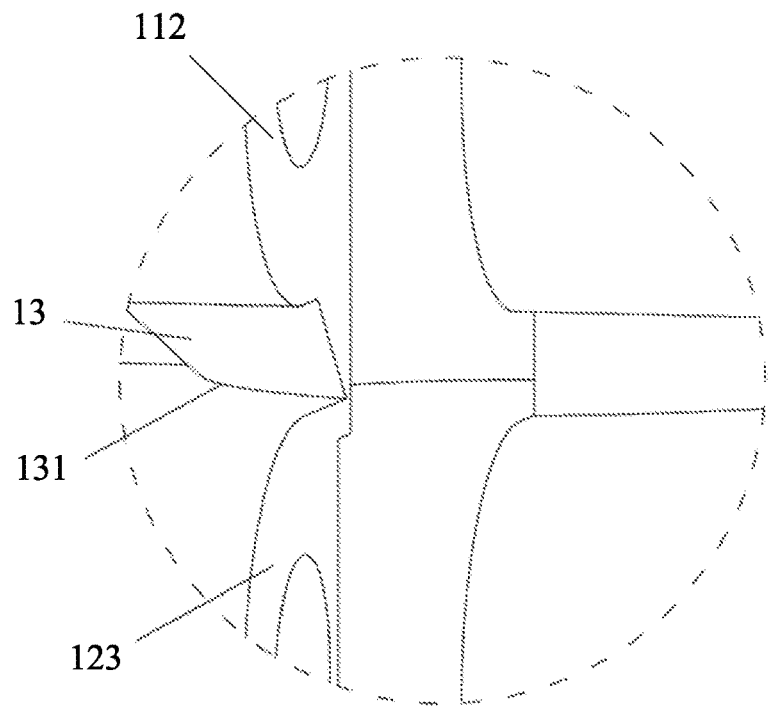
FIG. 7C illustrates an exploded partial enlarged schematic view of after the first groove is broken along the first thin wall according to the fourth embodiment of the present invention.
Figure 7D:
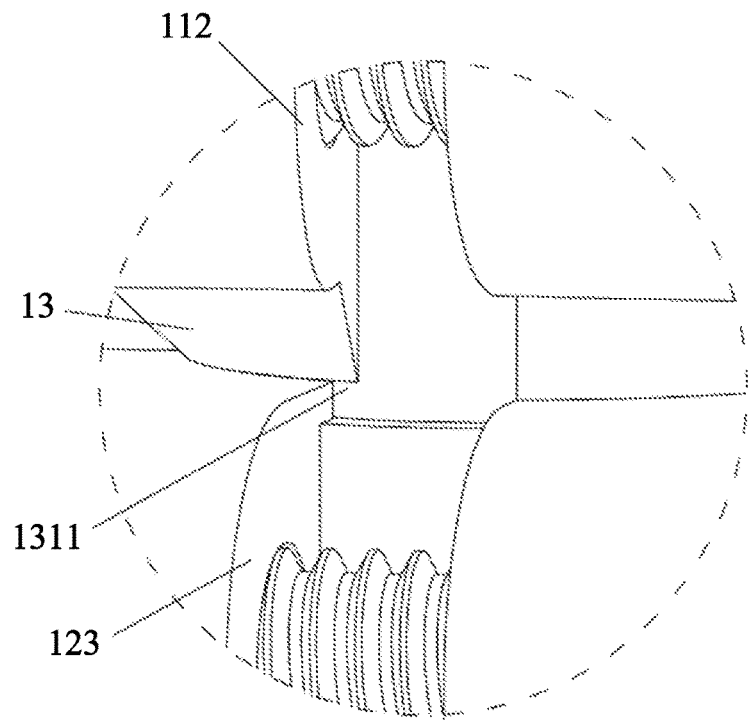
FIG. 7D illustrates a partial enlarged schematic view of the assembly of after the first groove is broken along the first thin wall according to the fourth embodiment of the present invention.

As shown in FIGS. 7A to 7D, wherein FIG. 7A and FIG. 7C are an exploded view according to the fourth embodiment of the present invention and an exploded partial enlarged view of before the first groove 13 is broken along the first thin wall 131. FIG. 7B and FIG. 7D are a schematic view of the assembly according to the fourth embodiment of the present invention and a schematic view of the assembly of after the first groove 13 is broken along the first thin wall 131. As shown in FIG. 7A, the second body portion 12 of the present embodiment has the second reception portion 121, and the second reception portion 121 is coupled to the first reception portion 111. The second reception portion 121 has a second notch 123, and the second notch 123 is provided with a third fastening member 4. The object 5 that is the first tube 52 further includes the second tube 53. The diameter of the second tube 53 is larger than the diameter of the first tube 52. As shown in FIG. 7C, the first groove 13 is broken along the first thin wall 131 to form the first broken opening 1311. As shown in FIG. 7B, one end of the second tube 53 is inserted into the second reception portion 121 so that the second notch 123 is pressed and tightened by the third fastening member 4, and the second body portion 12 and the second tube 53 are fixed to each other, and one end of the first tube 52 penetrates through the first reception portion 111, and is inserted into the second tube 53. The first tube 52 is slidably disposed in the second tube 53 and the first notch 112 is pressed by the first fastening member 2. As shown in FIG. 7D, the first groove 13 is broken along the first thin wall 131 to form the first broken opening 1311, so that the first body portion 11 is partially separated from the second body portion 12, and the variation range of the width of the first notch 112 is not restricted by the second body portion 12. The first notch 112 is pressed and tightened by the first fastening member 2, and the width of the first notch 112 becomes narrow so that the first body portion 11 and the first tube 52 are fixed to each other.

Figure 8A:
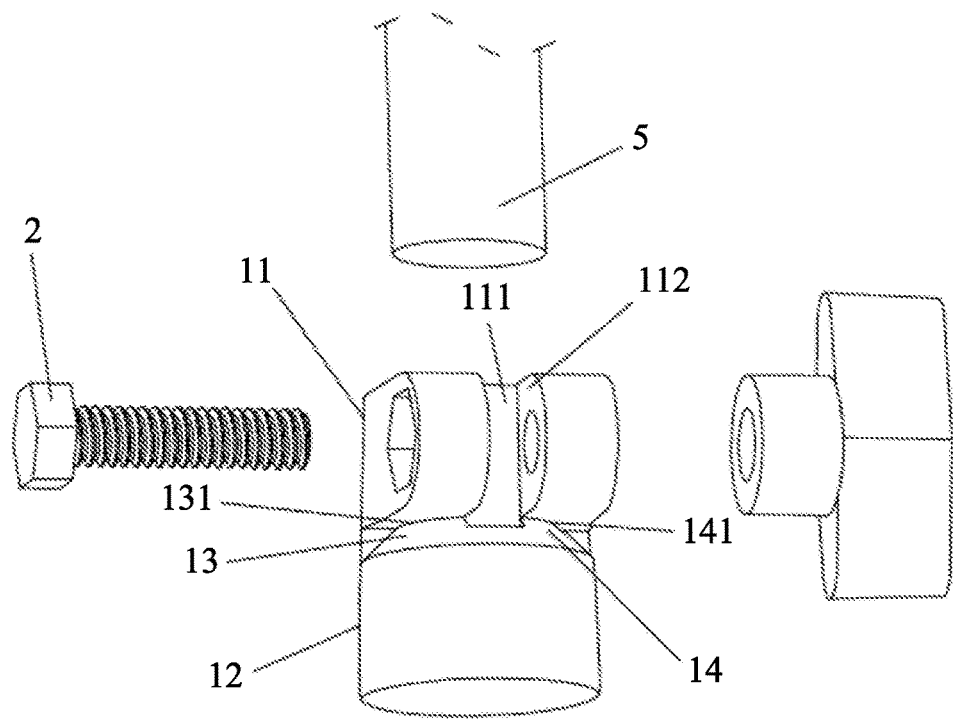
FIG. 8A illustrates a schematic view of the assembly according to the fifth embodiment of the present invention.
Figure 8B:
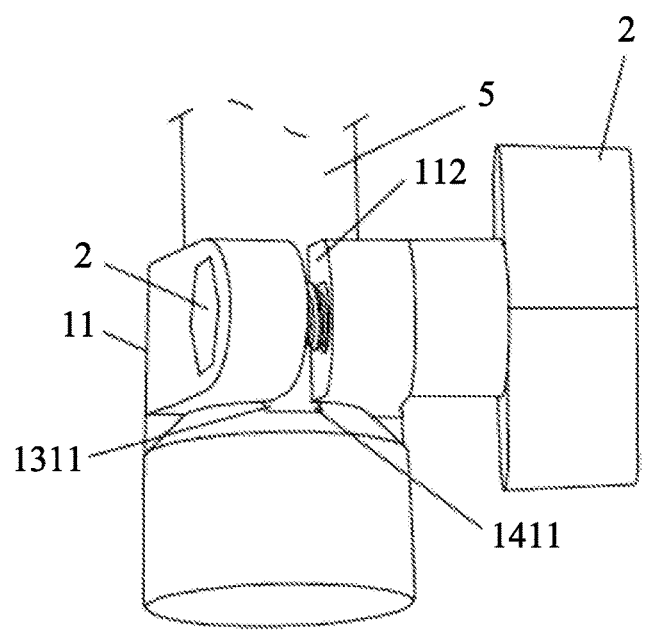
FIG. 8B illustrates a schematic view of the assembly according to the fifth embodiment of the present invention.

Preferably, FIG. 8A and FIG. 8B are schematic views of the assembly according to the fifth embodiment of the present invention. As shown in FIG. 8A, the first groove 13 is disposed on a side of the first notch 112 of the present embodiment, and the first groove 13 is separated from the first reception portion 111 by the first thin wall 131. A second groove 14 is disposed at a position corresponding to the other side of the first notch 112. The second groove 14 is separated from the first reception portion 111 by a second thin wall 141. As shown in FIG. 8B, one end of the object 5 penetrates through the first recessed portion 111 and the first notch 112 is pressed by the first fastening member 2 so that the first groove 13 is broken along the first thin wall 131, and the second groove 14 is broken along the second thin wall 141 to form the first breaking opening 1311 and a second broken opening 1411 so that the first body portion 11 is partially separated from the second body portion 12. The variation range of the first notch 112 is not restricted by the second body portion 12. The first notch 112 is pressed and tightened by the fastening member 2, and the width of the first notch 112 becomes narrow so that the first body portion 11 and the object 5 are fixed to each other The above description is only for explaining the preferred embodiments of the present invention, and is not intended to limit the present invention. Therefore, any form of the changes should be included in the scope of the invention as claimed.

What is claimed is:

1. A sleeve for sleeving on an object, comprising:
   a first body portion having a first reception portion, wherein the first reception portion has a first notch, and the first notch is provided with a first fastening member;
   a second body portion coupled to the first body portion; and
   a first groove, wherein one end of the first groove is disposed at an adjacent position between the first notch and the second body portion, and the other end of the first groove extends to a position along an outer edge of a connection between the first body portion and the second body portion, and the first groove is separated from the first reception portion by a first thin wall;
   wherein one end of the object penetrates through the first reception portion, and the first notch is pressed by the first fastening member so that the first groove is broken along the first thin wall to form a first broken opening and the first body portion is partially separated from the second body portion and a variation range of a width of the first notch is not restricted by the second body portion, and the first notch is pressed and tightened by the first fastening member, and the width of the first notch becomes narrow so that the first body portion and the object are fixed to each other.

2. The sleeve of claim 1, wherein the object is a spherical body, and the spherical body has a screw extending outwardly from a center thereof.

3. The sleeve of claim 1, wherein the second body portion has a second reception portion, and the second reception portion is coupled to the first reception portion.

4. The sleeve of claim 3, wherein the object that is a first tube further includes a second tube, and the sleeve further includes a second fastening member, and a diameter of the second tube is larger than a diameter of the first tube so that one end of the second tube is inserted into the second reception portion, and the second fastening member penetrates through a predetermined hole of the second body portion to fix the second body portion and the second tube together, one end of the first tube penetrates through the first reception portion and is inserted into the second tube, so that the first tube is slidably disposed in the second tube, when the first notch is pressed and tightened by the first fastening member, the first body portion and the first tube are fixed to each other.

5. The sleeve of claim 3, wherein the second reception portion has a second notch, and the second notch is provided with a third fastening member, the object that is the first tube further includes a second tube, and a diameter of the second tube is larger than a diameter of the first tube so that one end of the second tube is inserted into the second reception portion, and the second notch is pressed and tightened by the third fastening member, so that the second body portion and the second tube are fixed to each other, one end of the first tube penetrates through the first reception portion and is inserted into the second tube, so that the first tube is slidably disposed in the second tube, when the first notch is pressed and tightened by the first fastening member, the first body portion and the first tube are fixed to each other.

6. The sleeve of claim 1, wherein the first groove is disposed on a side of the first notch, and the first groove is separated from the first reception portion by the first thin wall, and a second groove is disposed on a position corresponding to the other side of the first notch, and the second groove is separated from the first reception portion by a second thin wall.

* * * * *